Dec. 17, 1929.     F. UNGAR     1,739,930
AUTOMOBILE BUMPER BRACKET AND AUXILIARY SHOCK ABSORBER
Filed Sept. 18, 1928
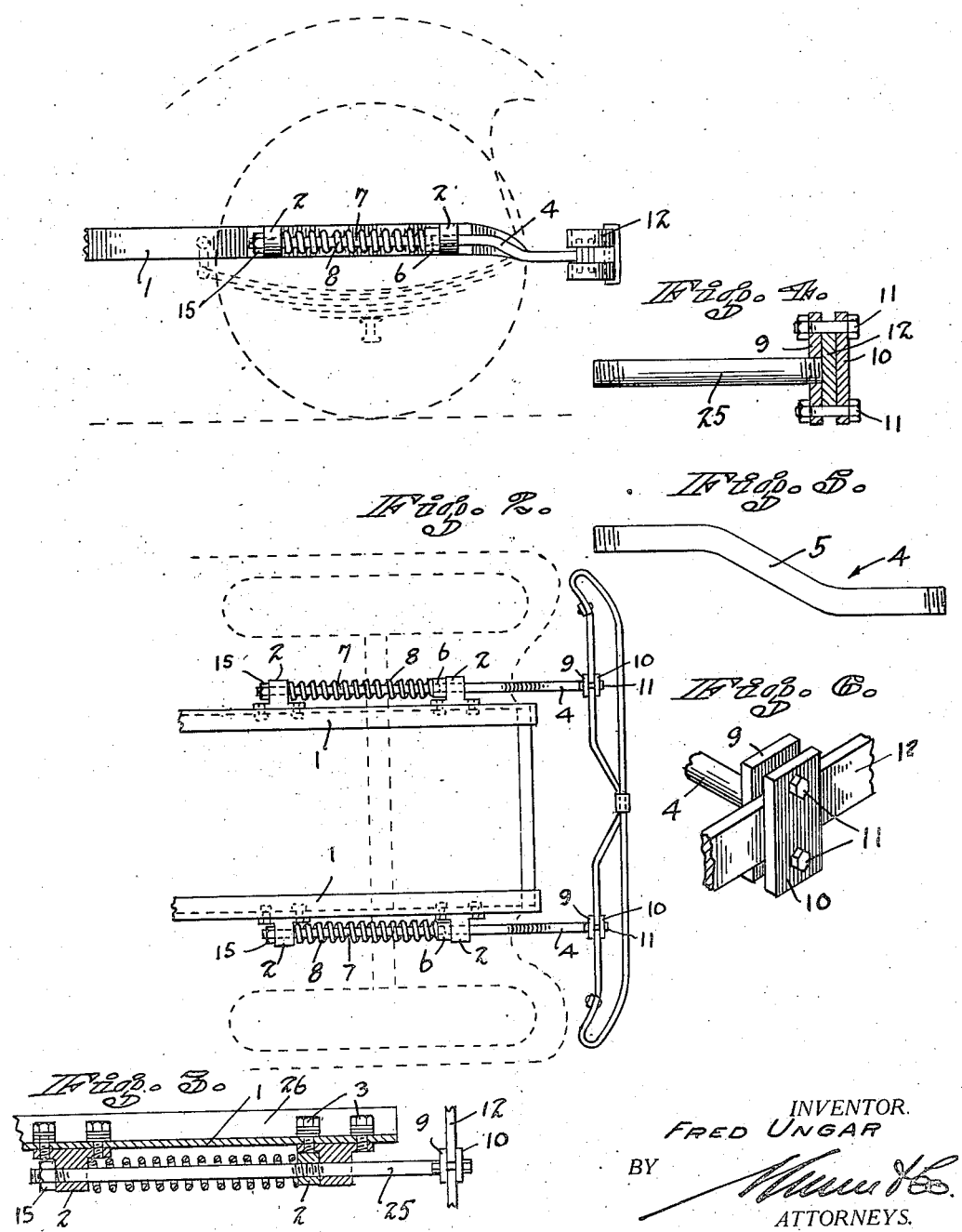
INVENTOR.
FRED UNGAR
BY
ATTORNEYS.

Patented Dec. 17, 1929

1,739,930

UNITED STATES PATENT OFFICE

FRED UNGAR, OF SAN FRANCISCO, CALIFORNIA

AUTOMOBILE BUMPER BRACKET AND AUXILIARY SHOCK ABSORBER

Application filed September 18, 1928. Serial No. 306,766.

My invention relates to improvements in automobile bumper brackets and auxiliary shock absorbers, and it consists in the combinations, constructions and arrangements hereinafter described and claimed.

An object of my invention is to provide an auxiliary shock absorber that will withstand a force of considerable more strength than is possible with the standard bumper. The bumper withstands a compression strength of approximately 3500 pounds. The auxiliary shock absorber is designed to withstand a pressure of 15,000 pounds. In this way the car is protected far more effectively than is possible with the use of only a bumper.

A further object of my invention is to provide a device of the type described which is extremely simple in construction and which is durable and efficient for the purpose intended.

Other objects and advantages will appear as the specification proceeds, and the novel features will be particularly pointed out in the appended claims.

My invention is illustrated in the accompanying drawing forming a part of this application, in which Figure 1 shows a side elevation of the device;

Figure 2 is a top plan view;

Figure 3 is a longitudinal section of a modified form of the device;

Figure 4 is a vertical section through Figure 3;

Figure 5 is a view of a portion of the device shown in Figure 1; and

Figure 6 is a perspective view of the bumper bracket.

In carrying out my invention, I make use of a chassis 1, and I mount bearings 2 on the chassis. Figure 3 shows how the bearings are held in place by cap screws 3. In the bearings I slidably mount bumper-supporting arms 4. In Figures 1, 2 and 5 I show these arms as being bent slightly at 5 to accord with the curve in the front of the chassis 1. The arms are threaded into collars 6, and these collars form a coupling between the arms and rods 7. This is clearly shown in Figure 3.

The rods 7 are slidably disposed in the rear bearings 2 and carry heavy springs 8 that have their ends bearing against the rear bearings 2 and the collars 6. The springs may be made to withstand any force desired such as, for example, a force of 15,000 pounds.

The front ends of the arms 4 are threaded into supporting members 9, and these in turn are connected to front supporting members 10 by bolts 11. The bolts are spaced far enough apart to receive a bumper 12.

The bumper 12 is designed to withstand a force of approximately 3500 pounds. If this force of impact should be greater, it will move the bumper and the arms rearwardly. This will compress the springs 8 and, as already stated, these springs will withstand a force of far greater magnitude. The force of the impact will be absorbed by the springs and not by the chassis. This will prevent the crumpling of the frame.

In Figures 3 and 4 I show a slightly modified form of the device. The arms 25 in this form of the device are straight. In all other respects the modified form is exactly the same as the form already described, and therefore like reference numerals are applied to similar parts. The straight arms are designed for use on trucks and the like where the chassis 26 is not provided with a downwardly-curved front portion.

Although I have shown and described two embodiments of my invention, it is to be understood that I reserve the right to employ such changes as may come within the scope of the invention as claimed.

Nuts 15 are mounted on the rods 7 and are used for keeping the springs 8 at the proper tension. They also keep the device rigid and prevent it from rattling.

I claim:

1. The combination with an automobile chassis and an automobile bumper, of front and rear bearings secured to said chassis, rods slidable in the rear bearings, bumper-supporting arms slidable in the front bearings, collars connecting said arms and rods together, and springs mounted on said rods and bearing against said collars and said rear bearings for moving said arms into extended position.

2. The combination with an automobile chassis and an automobile bumper, of front and rear bearings secured to said chassis, rods slidable in the rear bearings, bumper-supporting arms slidable in the front bearings, collars connecting said arms and rods together, springs mounted on said rods and bearing against said collars and said rear bearings for moving said arms into extended position, and nuts adjustably mounted on said rods and being engagable with said rear bearings for varying the tension of said springs.

3. The combination with an automobile chassis, of a bumper flexible enough to absorb up to substantially 3500 pounds, and heavy springs connecting the bumper with the chassis and designed to withstand a pressure up to substantially 15,000 pounds.

FRED UNGAR.